US008209390B1

(12) United States Patent
Gibbs et al.

(10) Patent No.: US 8,209,390 B1
(45) Date of Patent: Jun. 26, 2012

(54) METHOD AND APPARATUS FOR PROVIDING DESTINATION-ADDRESS SUGGESTIONS

(75) Inventors: Colin Gibbs, San Francisco, CA (US); Gabriel Cohen, Alameda, CA (US); Daisuke Miyakawa, Mountain View, CA (US); Daniel Lehmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,496

(22) Filed: Oct. 6, 2011

(51) Int. Cl.
*G06F 15/16* (2006.01)
(52) U.S. Cl. ........................................ 709/206; 709/224
(58) Field of Classification Search .......... 709/200–206, 709/217–227, 228–229
See application file for complete search history.

(56) References Cited

U.S. PATENT DOCUMENTS

| 7,103,161 | B2 * | 9/2006 | Tsuchiyama | 379/93.23 |
| 7,680,513 | B2 * | 3/2010 | Haitani et al. | 455/556.2 |
| 7,925,690 | B2 | 4/2011 | Smith et al. | |
| 2003/0125016 | A1 * | 7/2003 | Tsuchiyama | 455/412 |
| 2004/0122822 | A1 * | 6/2004 | Thompson et al. | 707/100 |
| 2007/0032267 | A1 * | 2/2007 | Haitani et al. | 455/556.2 |
| 2007/0161369 | A1 * | 7/2007 | Vishwanathan et al. | 455/418 |
| 2007/0240081 | A1 * | 10/2007 | Grossman et al. | 715/854 |
| 2009/0274286 | A1 | 11/2009 | O'Shaughnessy et al. | |
| 2010/0124915 | A1 * | 5/2010 | Haitani et al. | 455/415 |
| 2010/0299397 | A1 * | 11/2010 | Sambrani et al. | 709/206 |
| 2011/0083079 | A1 | 4/2011 | Farrell et al. | |

* cited by examiner

*Primary Examiner* — Moustafa M Meky
(74) *Attorney, Agent, or Firm* — McDonnell Boehnen Hulbert & Berghoff LLP

(57) ABSTRACT

A method and apparatus for providing destination-address suggestions for a new communication. For each of various communication addresses, multiple counts of use of the communication address are maintained, with each count being for a respective type of communication and/or for a respective application class. When a new communication of a particular type or by an application of a particular class is being established, the communication addresses are presented as destination-address suggestions in a rank-order based on the counts specific to the communication type and/or application class. The rank-ordering of can also take into account other factors, such as source persona, time, and location, for instance.

27 Claims, 8 Drawing Sheets

| ADDRESS | CALLING | MESSAGING |
|---------|---------|-----------|
| A1 | 1 | 25 |
| A2 | 13 | 5 |
| A3 | 0 | 3 |
| B1 | 9 | 11 |
| B2 | 7 | 33 |
| B3 | 15 | 0 |

Fig. 3

METHOD AND APPARATUS FOR PROVIDING DESTINATION-ADDRESS SUGGESTIONS

BACKGROUND

Unless otherwise indicated herein, the materials described in this section are not prior art to the claims and are not admitted to be prior art by inclusion in this section.

Modern communication devices typically provide a mechanism through which a user can specify or select a destination address, such as a telephone number, e-mail address, or the like, to be used for a new communication. In particular, a communication device may include a user interface through which a user can expressly type a desired address and/or select a desired address from a list of addresses presented by the device. For example, the device may include a display that presents a graphical user interface (GUI) defining a text field into which a user may type a destination address. As the user begins to type the address, the device may, after a predetermined number of entered characters, automatically present within the GUI a list of addresses that match the text typed up to that point. The user may then select an address from among those presented. As another example, the device may present an address book or communication log that lists various addresses, and the user may browse through that list and select a desired address to initiate communication therewith.

SUMMARY

Disclosed herein is a method and corresponding apparatus for providing destination-address suggestions on a communication device to assist a user in selecting an address to be used for a new communication.

In one respect, for instance, disclosed is a non-transitory computer-readable medium having stored program instructions that are executable by a processor to carry out various functions to provide destination-address suggestions. In practice, the functions may include determining a first plurality of counts of communications of a first communication type, with each count in the first plurality of counts being based on a respective quantity of communications of the first communication type placed to a respective communication address in a plurality of communication addresses. Further, the functions may include determining a second plurality of counts of communications of a second communication type, with each count in the second plurality of counts being based on a respective quantity of communications of the second communication type placed to a respective communication address in the plurality of communication addresses. And the first communication type and second communication type may be mutually exclusive.

The functions may then include detecting a first request for a plurality of destination address suggestions, where the first request is received from a first application program and is associated with a first new communication, and where the first new communication is of the first communication type. In turn, the functions may include sending, in response to the first request, a first list comprising the plurality of communication addresses, wherein, in response to the first new communication being of the first communication type, the plurality of communication addresses in the first list are ordered according to a first rank-ordering that is based at least in part on the first plurality of counts. Moreover, at least one count from the first plurality of counts is based at least in part on one or more communications placed by at least a second application program different from the first application program.

With these functions, the first application program may then send the first list for output at a display. A user may then conveniently select one of the displayed destination addresses to be used for the first new communication.

In another respect, in addition to determining the first plurality of counts and the second plurality of counts, the functions may include detecting a request for destination-address suggestions for a new communication and, in response to the request, (i) if the new communication is of the first communication type, then causing a user interface to present a first list comprising the plurality of communication addresses sorted based at least in part on the first plurality of counts determined for the plurality of communication addresses and not based on the second plurality of counts determined for the plurality of communication addresses, but (ii) if the new communication is of the second communication type, then causing the user interface to present a second list comprising the plurality of communication addresses sorted based at least in part on the second plurality of counts determined for the plurality of communication addresses and not based on the first plurality of counts determined for the plurality of communication addresses.

In still another respect, disclosed is a method for presenting destination-address suggestions. The method may involve a communication device determining a first plurality of counts of communications of a first communication type, with each count in the first plurality of counts being based on a respective quantity of communications of the first communication type placed to a respective communication address in a plurality of communication addresses. Further, the method may involve the communication device determining a second plurality of counts of communications of a second communication type, with each count in the second plurality of counts being based on a respective quantity of communications of the second communication type placed to a respective communication address in the plurality of communication addresses, the first communication type and the second communication type being mutually exclusive The method may then involve the communication device detecting a request for destination-address suggestions for a new communication and, responsive to the request, (i) if the new communication is of the first communication type, then the communication device presenting on a user interface a first list comprising the plurality of communication addresses sorted based at least in part on the first plurality of counts determined for the plurality of communication addresses and not based on the second plurality of counts determined for the plurality of communication addresses, but (ii) if the new communication is of the second communication type, then the communication device presenting on the user interface a second list comprising the plurality of communication addresses sorted based at least in part on the second plurality of counts determined for the plurality of communication addresses and not based on the first plurality of counts determined for the plurality of communication addresses.

Alternatively or additionally, the method may involve a computer processor determining a first plurality of counts of communications placed by one or more applications of a first application class, with each count in the first plurality of counts being based on a respective quantity of communications placed by the one or more applications of the first application class to a respective communication address in a plurality of communication addresses, and the computer processor determining a second plurality of counts of communications placed by one or more applications of a second application class, with each count in the second plurality of counts being based on a respective quantity of communications placed by the one or more applications of the second application class to a respective communication address in the plurality of communication addresses.

The method may then involve the computer processor detecting a first request for a plurality of destination-address suggestions, where the first request is received from a first application and is associated with a first new communication, and where the first application is a member of the first application class. Further, the method may involve, in response to the first request, the computer processor causing a user interface to present a first list comprising the plurality of the communication addresses, wherein, in response to the first application being a member of the first application class, the plurality of communication addresses in the first list are ordered according to a first rank-ordering that is based at least in part on the first plurality of counts of communications placed by the one or more applications of the first application class.

Further, the method may involve the computer processor detecting a second request for a plurality of destination-address suggestions, where the second request is received from a second application and is associated with a second new communication, and where the second application is a member of the second application class. And the method may then involve, in response to the second request, the computer processor causing the user interface to present a second list comprising the plurality of communication addresses, wherein, in response to the second application being a member of the second application class, the plurality of communication addresses in the second list are ordered according to a second rank-ordering that is based at least in part on the second plurality of counts of communications placed by the one or more applications of the second application class, the second rank-ordering being different than the first rank-ordering.

These, as well as other aspects, advantages, and alternatives will become more apparent to those of ordinary skill in the art by reading the following detailed description, with reference where appropriate to the accompanying drawings. Further, it should be understood that the description provided in this summary section and elsewhere in this document is intended to describe the method and apparatus by example only and not by way of limitation.

BRIEF DESCRIPTION OF THE DRAWINGS

FIG. 3 is a depiction of example use-count data for different communication classifications.

DETAILED DESCRIPTION

Figure 1:
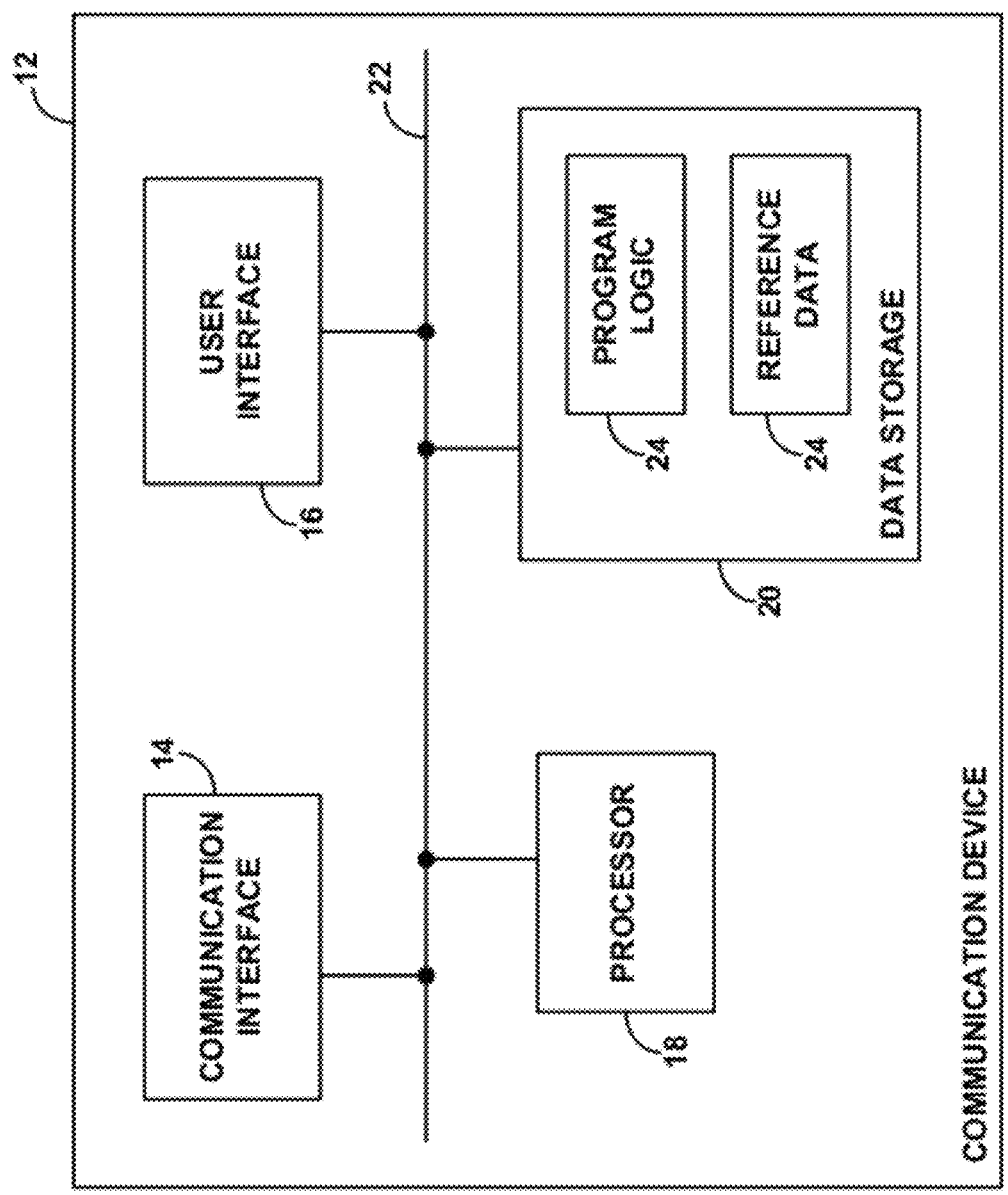
FIG. 1 is a simplified block diagram of a communication device operable within the present method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

1. Overview

An exemplary implementation of the present method involves establishing, for each address of a plurality of addresses, multiple separate counts of communications placed to the address, with each count corresponding to a respective type of communication or class of communication applications. In turn, when a new communication of a particular type or by a particular class of application is being established, the method involves providing a list including the addresses rank-ordered based on the counts of communications for that particular communication type or application class. As a result, a given set of addresses may be presented to the user in one rank order if the communication at issue is a particular type or is being established by an application of a particular class, but the same set of addresses may be presented to the user in an altogether different rank order if the communication is a different type or is being established by an application of a different class. Furthermore, one or more of the counts that are used as a basis to establish the rank ordering for a particular communication type or application class may themselves be based on aggregate use of the address by multiple communication applications.

Advantageously, this process can help accommodate a situation where certain addresses are used for multiple different types of communications and/or by multiple different classes of applications and where a user's relative frequency of use of the addresses differs based on communication type or application class.

A good example of this is a traditional telephone number, such as one complying with the North American Numbering Plan, which may include an area code, an exchange code, and subscriber number. While such numbers are commonly used as destination addresses for telephone calls, in many cases the same numbers may also be used as destination addresses for text messages and the like. Given a set of such numbers, a user may tend to use certain numbers more for telephone calling and other numbers more for text messaging. For example, given telephone numbers A and B, the user may place telephone calls more often to number A than to number B, but the user may send text messages more often to number B than to number A.

When presenting numbers A and B as destination address suggestions for a new communication, the present method can help accommodate this scenario by determining what type of communication is being established and then presenting the numbers rank-ordered based on that determined type. For example, if the communication is a telephone call, then the method may involve providing the numbers ordered as A-B so that the number more commonly used for telephone calls (and therefore perhaps more likely to be selected for the new telephone call) would be listed first. Whereas, if the communication is a text message, then the method may involve providing the numbers ordered as B-A so that the number more commonly used for text messages (and therefore perhaps more likely to be selected for the new text message) would be listed first.

To facilitate this differential rank-ordering of destination-address suggestions, the method may involve determining for each address multiple counts of use of the address, where each count is for a respective classification, such as a particular type of communication or a particular class of communication application.

In the example above, for instance, telephone calls could be considered to be of the communication type "calls", "real-time connections", or simply "telephone calls", and text messages could be considered to be of the communication type "messages", "non-real-time communications", or simply "text messages". Likewise, telephone calls may be placed using applications that are considered to be of a class such as "calling applications", "real-time calling applications", or simply "telephone applications", and text messages may be placed using applications that are considered to be of a class such as "messaging applications", "non-real-time communication applications", or simply "text messaging applications".

The method may then operate by determining respectively for each telephone number (e.g., A and B), a first count for one classification and a second count for another classification. For example, the method may involve determining respectively for each telephone number a first count of telephone calls placed to the number, and a second count of text messages placed (sent) to the number. And as another example, the method may involve determining respectively for each telephone number a first count of communications placed to the number using calling applications and a second count of communications placed to the number using messaging applications.

When the new communication of a particular type or by an application of a particular class is being established, the method may then involve determining the classification and providing a list including the telephone numbers with the appropriate rank-ordering, such that different rank-ordering would be provided depending on the classification. For instance, if a telephone call is being initiated, then the method may involve providing the numbers rank-ordered based on the first count (e.g., in order of frequency of use for telephone calls or by calling applications). Whereas if a text message is being initiated, then the method may involve providing the same numbers rank-ordered based on the second count (e.g., in order of frequency of use for text messages or by messaging applications).

Another good example of a type of address that may benefit from the present method is e-mail addresses, as e-mail addresses can similarly be used as destination addresses for multiple different types of communications and/or by multiple different classes of applications. For instance, while e-mail addresses are commonly used as destination addresses for e-mail messages compliant with the Simplified Mail Transfer Protocol (SMTP) or for communications by "e-mail" applications, in many cases the same e-mail addresses may also be used as destination addresses for text messages and the like or by "texting" applications. Further, a user may similarly have different relative frequency of use of a group of e-mail addresses for e-mail messaging than for text messaging.

In this scenario, the present method may then similarly involve determining for each e-mail address multiple counts of use, such as one count of use for e-mail messaging and one count of use for text messaging, or one count of use for messaging by e-mail applications and another count of use for messaging by texting applications. When a new communication is being established, if the communication is an e-mail message or being generated with an e-mail application, the method may then involve providing the addresses rank-ordered based on the use-counts for e-mail messaging. Whereas, if the communication is a text message or being generated with a texting application, the method may involve providing the addresses rank-ordered based the use-counts for text messaging.

It should be understood that the types of communication addresses, types of communications, and classes of communication applications described herein are merely examples, and that the method can extend to use with numerous other types and classes as well.

Without loss of generality, for instance, other examples of communication types include voice communication, video communication, image communication, text communication, circuit-switched communication, packet-switched communication, landline communication, wireless communication, communication using a particular application layer protocol, communication using a particular transport port, communication using a particular data link layer protocol, communication using a particular physical layer protocol or interface, communication using particular device or application settings, social networking communication, short messaging service (SMS) communication, multimedia messaging service (MMS) communication, unicast communication, and broadcast or group-destination communication (such as communications to a buddy group or circle), among others.

Likewise, also without loss of generality, other examples of classes of applications include circuit-switched communication applications, packet-switched communication (e.g., voice-over Internet Protocol (VoIP)) applications, audio chat applications, video conferencing applications, social-networking communication applications, and streaming media player applications, among others.

Further, in establishing the rank-ordering of communication addresses for presentation as destination-address suggestions, the present method may advantageously take into account additional factors beyond the use-counts specific to the communication type or application class at issue. Alternatively, these additional factors could be considered to define or be attributes of the type of communication or application class and may therefore be incorporated into the rank-ordering based on type of type of communication or application class.

By way of example, the method may take into account which of possibly multiple source personas is used for the past communications and for the new communication, and to give more or less weight (e.g., increased ranking or decreased ranking) to destination addresses based on whether the addresses were used more often or less often for communications from the same source persona that is being used for the new communication.

For instance, a given communication device and/or perhaps one or more applications running on the device, may allow a user to selectively operate under various source personas from which communications would be placed. Each source persona may be defined by a respective profile-setting on the device and may have a respective source address from which the device would place communications. For example, a user may have a business persona that specifies a business e-mail address from which communications will be sent, and the user may have a personal persona that specifies a personal e-mail address from which communications will be sent. The device may provide the user with a configuration option through which the user can set the device to use one profile or another. Alternatively or additionally, an individual communication application may allow the user to select a source persona to use for a new communication by selecting a "From" address from a list of available "From" addresses for instance.

When new communication of a given type is being generated by an application of a given class and is being placed with a given source persona, the present method may involve providing a list of destination-addresses in order of frequency of use based on the given communication type and/or given application class, and further based on the given source persona.

For example, if the ranking of addresses is done as a basic matter by sorting the addresses in order of their use-counts for the given communication type or given application class, the method may involve identifying each such communication that was placed with the given source persona and counting that communication twice or by some other scale-up factor. That way, a given address would be ranked higher if communications of the given type or by the given application class have been placed to that address more often with the given source persona than with other source personas, and a given address would be ranked lower if communications of the given type or by the given application class have been placed to that address less often with the given source persona than with other source personas.

As another example, ranking based on source persona could be achieved by categorizing instances of use (and thus use-counts) into "buckets" each corresponding with a respective source persona and then giving highest priority to the instances of use involving the persona currently at issue. For instance, if there are three personas P1, P2, and P3, and a new communication of a given type or by a given application class is being established using persona P2, the method may involve (i) establishing a first rank-ordering of communication addresses for communications that used persona P2, based on counts specific to the communication type and/or application class, (ii) establishing a second rank-ordering of communication addresses for communications that used any other persona (i.e., a composite rank-ordering for uses under personas P1 and P2), based on counts specific to the communication type and/or application class, and (iii) providing as the rank-ordered listing of destination addresses the first rank-ordering followed by the second rank-ordering. Other ways to account for source persona in the rank-ordering process may be possible as well.

Other factors that can be taken into account as a basis to adjust the rank-ordering of destination-addresses include time of communications and location of communications (if applicable).

By way of example, the method may take into account the time of day when past communications occurred and when the new communication is being generated and may give more or less weight to destination addresses based on whether the addresses were used more often or less often for communications at the same or similar time of day (e.g., range of time, such morning, afternoon, evening, weekday, weekend, etc.) as the new communication. For instance, if the ranking of addresses is done as a basic matter by sorting the addresses in order of their use-counts for the given communication type or given application class, the method may involve determining a current time of day for the new communication being generated and then scaling up the count for each past communication placed at a similar time of day. Further, the method could apply greater scaling or otherwise more weight for communications closer in time to the current time, and less scaling or otherwise less weight for communications farther in time from the current time.

Furthermore, the method may take into account how recent past communications occurred as a basis to tailor the rank-ordering, so as to rank higher communication addresses that have been used more recently than others. Factoring in the recency of past communications (i.e., how recently the past communications occurred) can be achieved in much the same way as factoring in the source persona of past communications as discussed above.

By way of example, if the ranking of addresses is done as a basic matter by sorting the addresses in order of their use-counts for the given communication type or given application class, the method may involve determining how recent each past communication was, and scaling the count for that communication accordingly. For instance, a communication that occurred very recently could be counted twice or by some other scale-up factor, whereas a communication that occurred a long time ago could be counted half or by some other scale-down factor. That way, a given address would be ranked higher as more communications of the given type or by the given application class have been placed to that address recently, and a given address would be ranked lower as fewer communications of the given type have been placed to the given address recently.

As another example, recency could be factored into the rank-ordering by categorizing instances of use (and thus use-counts) into "buckets" each corresponding with a respective level of recency, such as (a) one bucket for communications within the past three days, (b) one bucket for communications from four days old to one week old, (c) one bucket for communications from eight days old to one month old, and (d) one bucket for communications over one month old. For each bucket, the method may then involve establishing a rank-ordered listing as described herein, based on counts specific to the communication type and/or application class at issue, and perhaps based on one or more other factors. And the method may then involve sorting the rank-ordered listings in order of recency, such that the rank-ordered listing based on the most recent past communications is listed first (with highest priority), the rank-ordered listing based on the next most recent past communications is listed next (with next highest priority), and so forth.

This way, a given address could be ranked higher if communications of the given type or by the given application class have been placed to that address more often at a time similar to the current time, and a given address could be ranked lower if communications of the given type or by the given application class have been placed to that address less often at a time similar to the current time.

Likewise, the method may take into account the locations where past communications were placed and the location where the new communication is being generated and may give more or less weight to destination addresses based on whether the addresses were used more often or less often for communications placed at the same or similar location as the new location. For instance, if the ranking of addresses is done as a basic matter by sorting the addresses in order of their use-counts for the given communication type or given application class, the method may involve determining a current location for the new communication and then scaling up the count for each past communication placed at a similar location. Further, the method could similarly apply more weight for communications closer in location to the present location, and less weight for communications farther in location from the present location, such as by applying varying scaling factors or buckets, as described above with respect to recency of past communications.

This way, a given address could be ranked higher if communications of the given type or by the given application class have been placed to that address more often at a location similar to the present location, and a given address could be ranked lower if communications of the given type or by the given application class have been placed to that address less often at a location similar to the present location.

Note also that, for a given set of communication addresses, various counts could be established with respect to different proper subsets of the communication addresses, and the subset of addresses thus presented as the rank-ordered list of destination-address suggestions may differ depending on the communication type and/or application class.

For example, given a set of ten communication addresses A1-A10, it may be the case that only addresses A1-A8 have been used for a first type of communication, but only addresses A3-A10 have been used for a second type of communication. In that scenario, counts of communications of the first type may be determined for only addresses A1-A8, and counts of communications of the second type may be determined for only addresses A3-A10. When a new communication of the first type is being established, the method may then involve presenting addresses A1-A8 in rank-order based on their use-counts. Whereas, when a new communication of the second type is being established, the method may involve presenting addresses A3-A10 in rank-order based on their use counts. In practice, however, the subsets would not be mutually exclusive, so that there would be at least one address in one subset that is also in the other subset.

Note that, in this example, addresses A3-A8 each have multiple counts of use, one count for the first type of communication and one count for the second type of communication. The list of destination address suggestions may thus include addresses A3-A8 rank-ordered based on the counts specific to the communication type at issue. Yet the list of destination address suggestions may also include additional addresses. For instance, if the new communication is of the first communication type, then the list of destination address suggestions may also include addresses A1 and A2. And if the new communication is of the second communication type, then the list of destination address suggestions may also include addresses A9 and A10.

Furthermore, in some implementations of the method, an address to which no communications of a particular communication type and/or by a particular application class have been placed could be excluded altogether from the rank-ordered listing presented for a new communication of that communication type and/or by that application class. Alternatively, that non-use could be considered a count of zero for purposes of rank-ordering, which would likely put the communication address at the bottom of the presented list.

2. Example Architecture

As a general matter, the present method may be implemented by a communication device that facilitates various types of communications and/or has various communication applications through which a user may place communications. The method may then involve program logic on the device establishing, for each of multiple communication addresses, multiple counts of communications placed to the address, where each count is for a respective communication type and/or application class and may be based on communications by multiple applications. Further, the method may then involve the program logic detecting that a communication of a given type and/or by a given application class is being generated, and the program logic responsively using the count data specifically for the given type and/or given application class (e.g., and not for one or more other types or one or more other application classes) to rank-order the communication addresses and to provide a list including the addresses in the resulting rank-order for presentation to a user. Conveniently, the user may then select from the presented list a destination address for the device use for the new communication.

Alternatively or additionally, the method could be carried out by another device such as a network server (e.g., cloud server) for instance. To facilitate such an implementation in practice, the end-user device may be programmed to report to the server (or other device) various communications placed by the device, and based on that data, the server may programmatically establish for each of various addresses multiple counts of communication, each for a respective communication type and/or application class. Alternatively, the server may extract such data from network communication records, such as call detail records or the like that may be maintained by communication service providers (e.g., in network billing systems) for instance. When the end-user device is seeking to generate a new communication of a given type and/or by an application of a given class, the device may then query the server to obtain a listing of destination-address suggestions, and the server may provide to the device a listing of the communication addresses rank-ordered based on counts of use for the given communication type and/or application class. The end-user device may then present the rank-ordered listing to enable a user to readily select a desired destination address to be used for the communication.

Further, the method may also involve taking into consideration use counts for communications placed from multiple devices, such as a group of devices that are all associated with (e.g., registered under) a common user account or the like. For example, as multiple end-user devices place communications, they may each report the communications to a server, or the server may extract records of the communications from other records. The server may then establish, for each of multiple communication addresses, multiple consolidated counts of communications placed to that address by the group of devices, with each consolidated count being for a respective communication type and/or application class. When any one of the devices is seeking to generate a new communication of a given type and/or by an application of a given class, the device may then query the server for a listing of destination-address suggestions, and the server may respond with a listing rank-ordered based the counts specific to the given communication type and/or application class.

Referring now to the drawings, FIG. 1 is a simplified block diagram depicting functional components of an example communication device 12 operable within the present method. As a general matter the communication device may be any device that functions to place communications and to interact with a user. Examples of such devices, without limitation, include landline or wireless telephones, video conferencing terminals, computers, and other devices now known or later developed.

The example communication device 12 may itself execute the present method, to provide a user with destination-address suggestions for a new communication. Alternatively, the communication device 12 may work together with one or more other devices, such as a network server as discussed above, to facilitate one or more aspects of the method, such as establishment of multiple use counts per communication address, and presenting to a user a list of destination-address suggestions rank-ordered based on use counts for the communication type and/or application class at issue.

As shown in FIG. 1, the example communication device 12 includes a communication interface 14, a user interface 16, a computer processor 18, and data storage 20, all of which may be communicatively linked together by a system bus, network, or other connection mechanism 22. Although these components are shown as discrete blocks in the figure, they may be integrated together in any of a variety of ways. Further, although these components are shown as being within the communication device 12, some or all of the components could be provided external to the device or could be removable from the device.

Communication interface 14 comprises one or more communication-interface modules through which communication device 12 may engage in network communications, such as to place and receive communications for instance. Examples of such modules include RJ-11 and RJ-45 modules for coupling with landline telephone circuits or wired Ethernet circuits, chipsets and antennas for engaging in various forms of wireless communication such as WIFI, BLUETOOTH, LTE, WiMAX, CDMA, GSM, or HSDPA, and other types of communication interfaces now known or later developed.

User interface 16 functions to allow the device to communicate with a user (e.g., any and all users of the device), such as to present destination-address suggestions and to receive user selection of a destination address for use in placing a new communication. As such, the user interface may include one or more output components such as a display screen and a sound speaker and one or more input components such as a keypad or keyboard, a touch-sensitive screen or touch panel, and a microphone. Further, the user interface may include interfaces for coupling with external user interface components, such as an external display, a headset, and an external keyboard or touch panel. The user interface may also include analog-digital conversion circuitry, to facilitate digital processing of analog media (e.g., voice) provided to or received from a user.

Processor 18 comprises one or more general purpose processors (e.g., microprocessors) and/or one or more special purpose processors (e.g., application specific integrated circuits or digital signal processors). Data storage 20 may then be a non-transitory computer-readable medium including one or more volatile and/or non-volatile storage components, such as optical, magnetic, organic, or flash memory modules for instance. In the example communication device, as shown, data storage 20 contains program logic 24 and reference data 26. As a general matter, program logic 24 is executable by processor 18 to carry out various functions described herein, and reference data 26 includes data on which the program logic 24 operates, such as address data for instance.

Although data storage 20 is shown as a component of communication device 12, some or all aspects of the data storage could be provided separate from the communication device, such as on an external flash drive, an external magnetic or optical hard drive, a disc, or other non-transitory computer-readable medium.

Figure 2:
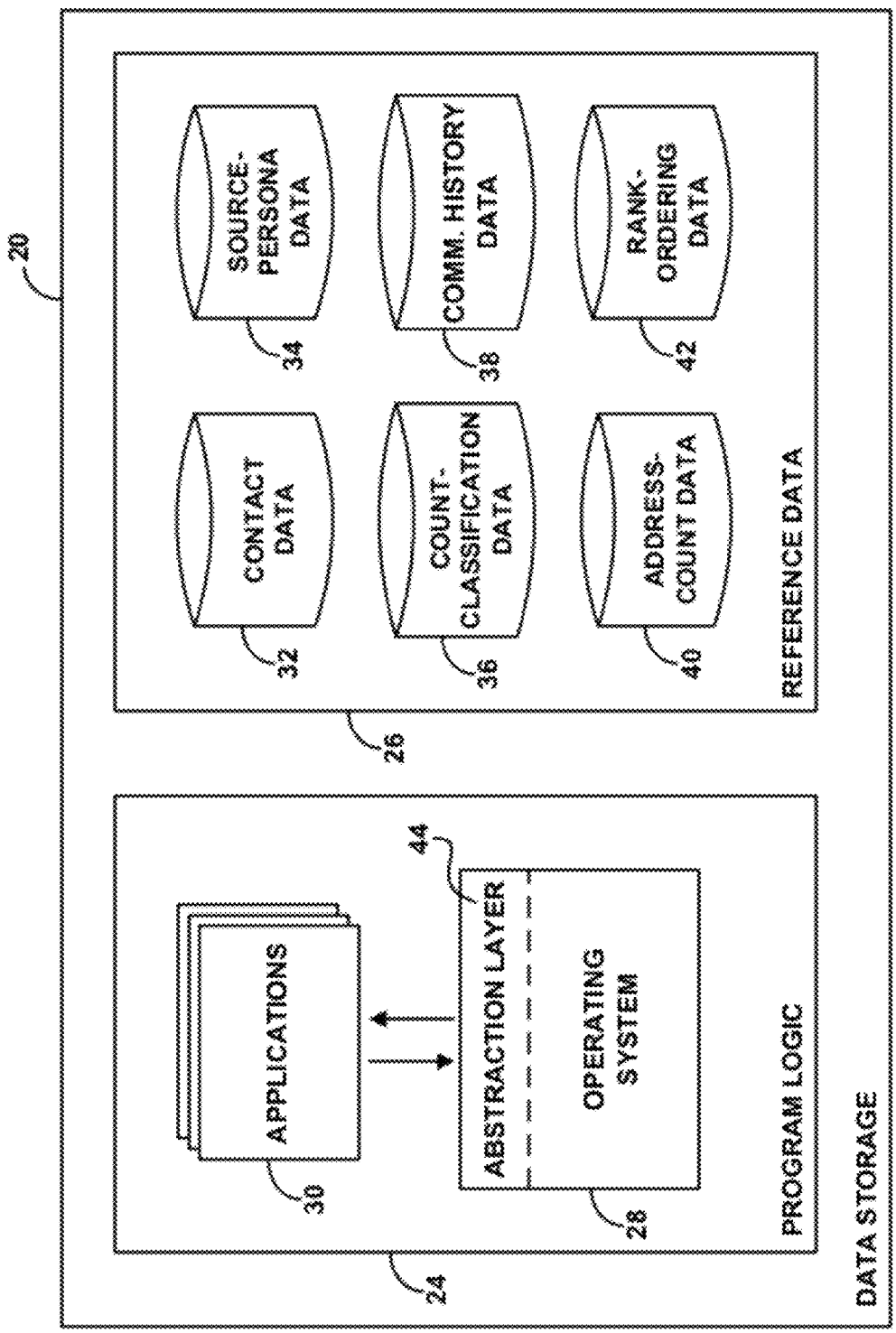
FIG. 2 is a more detailed diagram of representative non-transitory data storage.

FIG. 2 is next a more detailed diagram showing example data that may be included in data storage 20 to facilitate implementation of the present method. As shown in FIG. 2, program logic 24 includes an operating system 28 and numerous program applications 30, and reference data 26 includes contact data 32, source-persona data 34, count-classification data 36, communication-history data 38, address-count data 40, and rank-ordering data 42, all of which may be stored in a relational database structure or other manner.

Operating system 28 may be any operating system that facilitates core operation of the communication device, such as application interaction with the communication interface 14 and user interface 16 for instance. As shown, operating system 28 provides (includes) an abstraction layer (program logic defining an abstraction layer) 44 with which the various applications 30 may interact through an application programming interface (API) to invoke, facilitate, and benefit from various features of the method.

Application programs 30 include programs or program modules executable on the communication device 14 to provide useful functions. In terms of the present method, the application programs 30 include one or more communication applications, which may be applications of the type noted above for instance. For example, representative communication applications may include (i) a circuit-voice telephone application for placing traditional telephone calls, (ii) a voice over Internet Protocol (VoIP) application for placing voice calls or engaging in VoIP conferencing, (iii) a SMS/MMS application for sending SMS text messages and MMS messages such as photo-sharing messages for instance, and (iv) an e-mail application for sending e-mail messages compliant with SMTP for instance. As noted above, numerous other examples are possible as well.

These communication applications may be provided on device 12 at the same time the operating system 28 is provided on the device (e.g., at the time of device manufacture or distribution, or at the time of operating system update) or may be loaded onto the device at some other time. Further, although the applications 30 are shown separate from the operating system 28, one or more of the applications may itself be integral to the operating system. For example, a representative device may include a contact management application for maintaining and allowing user interaction with a phone book or other contact list as a core function of the device. Such an application may be provided as an integral component of the operating system itself or may be provided separate from the operating system.

A representative communication application may function to allow user generation of a new communication, such as user placement of a circuit-call or VoIP call, user composition and sending of SMS/MMS messages, user composition and sending of e-mail messages, and so forth, and to present (or cause to be presented) to the user a list of destination-address suggestions for the new communication, with the list being rank-ordered based on counts specific to the communication type and/or application class at issue.

In practice, for instance, the communication application may define a GUI to be presented on a display of the device and to interact with the user so receive a user request to generate the new communication, to present to the user the destination-address suggestions, and to receive user selection or other input of a desired destination-address for the communication. For instance, the application may provide a drop-down listing of the rank-ordered destination-address suggestions in or near a "To" field of the GUI or as a separate dialog. Such a list could be filtered to be for a particular contact or group of contacts, based on data entered by the user, such as by limiting the list to addresses for contacts having that have names matching characters entered so far by the user.

Further, the communication application may function to interact with the operating system 28 so as to report that communications were placed to particular communication addresses and to query and receive from the operating system a list of destination-address suggestions for a new communication, in accordance with the present method. In terms of reporting communications, the act of an application placing a communication may itself be detected by the operating system as a report of the communication being placed, or the application may separately report the communication.

In practice, the operating system 28 may then include logic for carrying out particular functions of the present method. For example, the operating system 28 may include logic to receive from various communication applications reports of communications placed to particular addresses, and logic to determine, for each communication address, multiple counts of communications placed to the address, where each count is for a respective communication type and/or application class. Further, the operating system may include logic to receive from an application of a given class a request for a list of destination-address suggestions for a new communication of a given type, to rank-order the destination-addresses based on use counts specific to that communication type and/or application class (and perhaps based on one or more additional factors, such as source persona, time, and/or location for instance), and to responsively provide the requesting application with a list including the rank-ordered addresses for the application to present to a user.

Alternatively, some or all of the logic for carrying out functions of the present method could be defined by one or more of the application programs 30. For instance, a special application could be installed as a utility on the device specifically for purposes of facilitating the present method. Alternatively, one or more applications installed on the device for some other purpose may include logic to carry out one or more functions of the method.

Among the reference data 26, contact data 32 may take the form of address book data suitable for presentation by an contact management application. Such contact data may include contact records, each of which may be for a respective contact (e.g., person or business) and may specify for the contact one or more addresses, such as one or more telephone numbers and/or one or more e-mail addresses, among possibly other types of addresses, with each address having a label or identifier (e.g., home, work, mobile, etc.) to facilitate reference to and presentation of the address. Each contact record may further provide other information for the contact, such as a contact name and a thumbnail image representing the contact for instance, so that a text and/or graphical representation of the contact can be presented.

By way of example, the contact data 32 may include a record for contact name "Adam," specifying addresses A1, A2, and A3, and the contact data may further include a record for contact name "Betty," specifying addresses B1, B2, and B3. These addresses may include various address types, such as e-mail addresses and telephone numbers for instance or may all be one type of address. Further, it is possible that one or more contacts listed in the contact database may have just a single address listed (or a single address of a particular type listed), or may have no addresses listed at all.

Source-persona data 34 may then define a currently active source persona for the device and may further define one or more other source personas that can be made active through a configuration interface or on a scheduled basis for instance.

The source-persona data 34 may define for each source persona one or more corresponding source addresses to be used for communications from the device. For instance, for each source persona, the data may define a respective source e-mail address, from which e-mail messages would by default be sent, and a respective source telephone number from which calls would be placed. (Depending on the implementation, it may be possible for the communication device to switch between multiple "lines" each having a different associated telephone number, or it may be possible for the communication device to deliver the currently active source telephone number as caller-ID information in call setup signaling.)

When a communication application enters a mode to generate a new communication, the application may query the operating system to obtain the applicable source address to use for the communication and may set itself by default to use that communication address. Alternatively, the application may allow a user to select a desired source address from a list of available source addresses, and the source-persona data 34 may implicitly define which source persona corresponds with that selected source address and thus which source persona is being used for the communication.

Count-classification data 36 may specify various classifications that can be used to facilitate establishing the use-counts in the present method. By way of example, the count-classification data may specify various communication types, various application classes, and/or various other classifications, and can provide for each classification a corresponding label, tag, or identifier that can be used to reference the classification. In practice, a communication application may use this count-classification data to inform the operating system of the count-classification (or classifications) for a given communication, by specifying the appropriate label, tag or identifier. The operating system may then use that specification as a basis to increment one or more appropriate counts for the destination address of the communication, namely, a count for each respective classification of the communication.

Communication-history data 38 may include records of communications placed by the device and may facilitate establishment of use-counts per address, thus defining an example of usage records. The record of each communication may identify attributes of the communication, such as source address/persona, destination address, classification(s) of communication (e.g., communication type and/or application class), timestamp, location (e.g., as determined by GPS or other available location-determination technology), duration, and disposition (e.g., successfully completed, attempted but unsuccessful, etc.)

Some or all of the communication-history records may be provided to the operating system by the applications that place the communications, at the time the communications are placed (e.g., initiated, successfully communicated, or finished) or at some other time. Alternatively or additionally, some or all of these records may be established by the operating system detecting placement of the communications and recording data regarding the communications. Further, to help ensure relevance of the communication-history data 38, the operating system could be set to automatically delete communication-history data records older than a defined period of time (such as a month or some other configurable duration).

Address-count data 40 then represents the counts per address that are usable to establish rank-ordering of destination-address suggestions in accordance with the present method. Thus, the address-count data 40 may include, respectively for each of multiple addresses, multiple counts of use of the address as a destination address for a communication placed by the device, where each count is specifically for a respective classification, such as for a particular communication type and/or a particular application class.

Phrased another way, the address-count data 40 may include multiple sets of counts, each set being for a particular classification and including a classification-specific count respectively for each of multiple addresses. For instance, the address-count data 40 may include a first set of counts of communications of a first classification, with each count in the first set being based on a quantity of communications of the first classification placed to a different respective address, such as one count of the number of communications of the first classification placed respectively to each address. And the address-count data 40 may then further include a second set of counts of communications of a second classification, with each count in the second set being based on a quantity of communications of the second classification placed to a different respective address, such as one count of the number of communications of the second classification placed respectively to each address.

In turn, rank-ordering data 42 includes rank-ordered listings of addresses in accordance with the present method. Optimally, the rank-ordering data 42 would include, for a given set of addresses, a different rank-ordering based on use-counts for a particular communication type and/or application class than based on use-counts for a different communication type and/or different application class. In practice, for instance, the rank-ordering data 42 could be established by sorting the addresses according to a rank-ordering that is based at least in part on the pertinent address-count data for the addresses. For example, a first-rank ordered listing could be established by sorting the addresses in order of their respective counts of use for communications of a first classification of communication, whereas a second rank-ordered listing could be established by sorting the addresses in order of their respective counts of use for communications of a second classification of communication.

FIG. 3 depicts an example of address-count data 40 for the addresses of example users Adam and Betty described above. As shown in FIG. 3, the address-count data 40 is arranged as a table of data in which each row corresponds with a respective address and each column represents a respective communication classification. In the example shown, two representative classifications are provided, one for "calling" and another for "messaging," and the table then specifies for each classification a corresponding count of use of the address as a destination address.

In this example, the "calling" classification could cover use by multiple calling applications, such as one or more circuit-voice applications, one or more VoIP applications, one or more video conferencing applications, for instance. Thus, a given count shown in the example table could encompass communications that were placed by two or more applications, with the operating system consolidating use data across those applications into a representative total count for the classification. Likewise, the "messaging" classification could cover use by multiple messaging applications, such as one or more SMS/MMS application and one or more e-mailing applications for instance. Other examples are possible as well.

As indicated by the table of FIG. 3, address A1 has been used for 1 instance of calling but for 25 instances of messaging, whereas address A2 has been used for 13 instances of calling but for just 5 instances of messaging. Considering just those two addresses, then, the logic defined by the present method may be arranged to provide destination-address suggestions rank-ordered as A1-A2 (i.e., with A1 having higher priority than A2) if the new communication at issue is a calling communication but to provide the destination-address suggestions rank-ordered as A2-A1 (i.e., with A2 having higher priority than A1) if the new communication at issue is a messaging communication. Further, as noted above, the rank-ordering of the destination-address suggestions could take into account other factors as well, such as source persona, time, and/or location.

3. Example Operation

Figure 4:
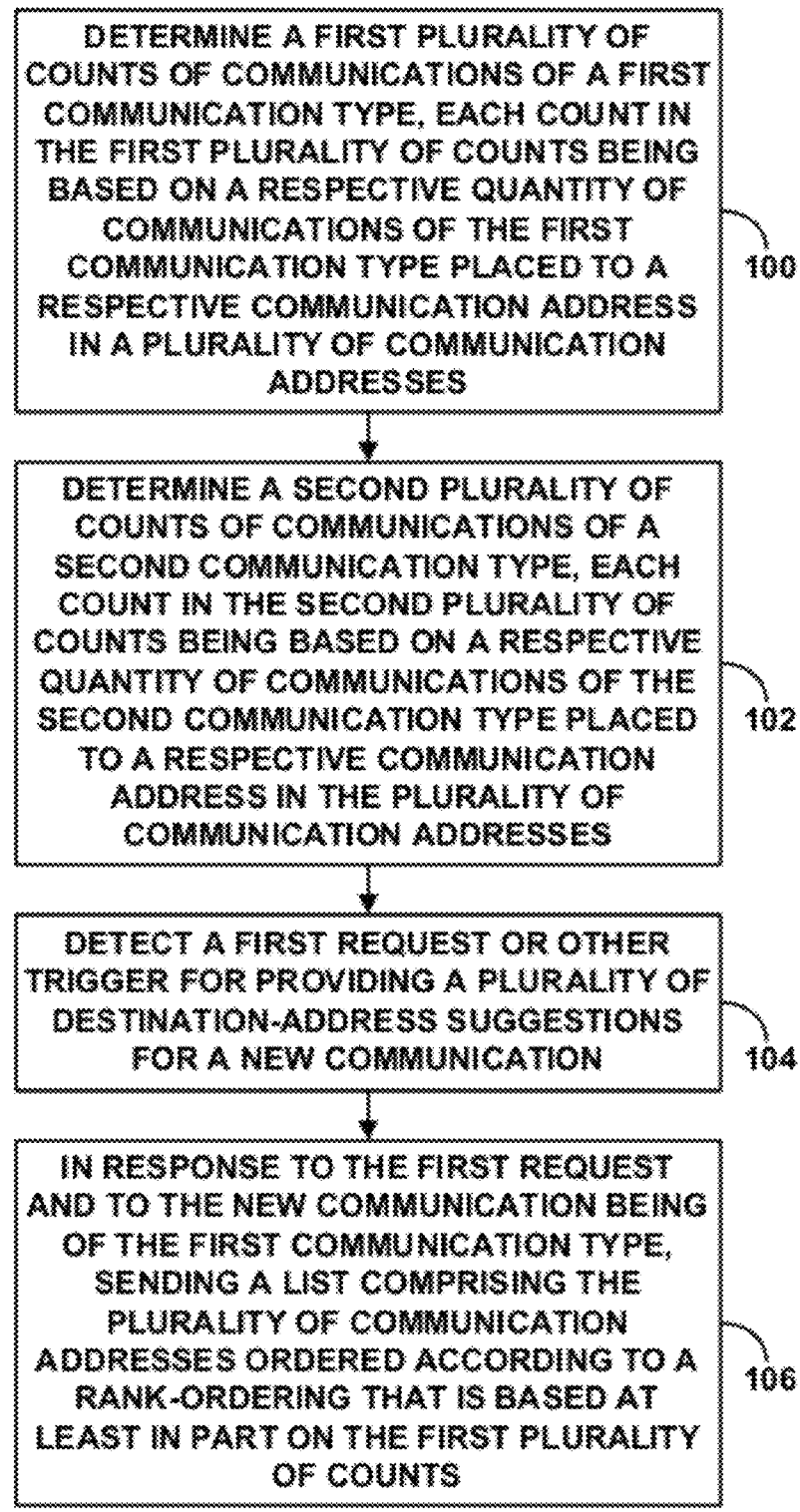
FIG. 4 is a flow chart depicting functions that can be carried out in accordance with the method.

FIG. 4 is next a flow chart depicting functions that can be carried out in accordance with the present method.

As shown in FIG. 4, at block 100, the functions may include determining a first plurality of counts of communications of a first communication type, each count in the first plurality of counts being based on a respective quantity of communications of the first communication type placed to a respective communication address in a plurality of communication addresses. For instance, given a set of communication addresses A1-A10, the first plurality of counts of communications of the first communication type may include, respectively for each address in the set (i.e., for each different address in the set), a count of communications of the first communication type placed to that address. A count may be based on a quantity of communications by being the quantity itself or by being derived from the quantity, such as by being a scaled version of the quantity for instance.

At block 102, the functions may further include determining a second plurality of counts of communications of a second communication type, each count in the second plurality of counts being based on a respective quantity of communications of the second communication type placed to a respective communication address in the plurality of communication addresses. For instance, given the set of communication addresses A1-A10, the second plurality of counts of communications of the second communication type may include, respectively for each address in the set (i.e., for each different address in the set), a count of communications of the second communication type placed to that address.

In practice, the functions depicted at blocks 100 and 102 may come down to determining for each of a plurality of communications addresses, multiple counts of communications placed to the address, each count being for a respective type of communication of a plurality of types of communication, the plurality of types including a first type and a second type.

In practice, the operating system can implement these determining functions based on communication-history data 38, either on an ongoing basis or dynamically when necessary to determine particular counts based on the communication type and/or application class of a new communication, such as dynamically when necessary to establish a rank-ordered listing of destination-address suggestions. The act of determining may include calculating, updating (e.g., incrementing), receiving, or otherwise establishing or learning.

For example, each time the device places a communication (e.g., places a call or sends a message), the operating system may increment the applicable count(s) for the destination address of the communication. With the table of FIG. 3, for instance, each time the device places a call to address A1, the operating system could increment the calling count for address A1, whereas each time the device sends a message to address A1, the operating system could increment the messaging count for address A1, and so on.

As noted above, additional factors could be taken into consideration when determining these use-counts. As some such additional factors may be specific to the new communication being established (such as adjusting the ranking based on the source-persona being used for the new communication and/or based on the time (e.g., recency) or location of the new communication), it may be best to establish this count data at the time the new communication is being established, such as in response to user invocation of an application function to dial or address the communication. The additional factor(s) could then be taken into consideration in the manner discussed above or in some other way. Alternatively, one or more additional factors could be established by sorting communications into buckets specific to particular characteristics (e.g., persona-based buckets, recency-based buckets, or distance based buckets) and establishing counts on a per-bucket basis, so that rank-ordering can be done on a bucket-specific basis as discussed above.

The counts established by the operating system can be restricted to addresses that were actually used as destinations for one or more communications. For instance, the operating system can build up the list of applicable addresses as the address are used, and each time an address is used again then increment one or more applicable counts for the address. Advantageously, this would help focus the destination-address suggestions on those addresses that have actually be used before. Alternatively, the counts could cover all addresses in the contact data 32 for instance, though any addresses that have not been used as destination addresses may have zero counts as noted above.

At block 104, the functions may then further include detecting a first request or other trigger for providing a plurality of destination-address suggestions. Detecting this request or other trigger can take various forms. By way of example, the operating system can detect the request by receiving the request from a communication application (an application program), through the abstraction layer 44. For instance, the operating system may receive from the communication application an API query seeking a list of destination-address suggestions. In practice, this request may be associated with a new communication of the first communication type. For instance, the communication application may function to generate and send the API query upon receipt of user input requesting the generation of the new communication of the first communication type. Detecting the request may take other forms as well, such as merely detecting that the new communication is being established for instance.

As a specific example, if the application is a telephone calling application, the application may provide an interface element such as a text box into which a user can type a contact name or telephone number to call. When the application detects that GUI focus is on that element, the application may then generate and send the API query. Alternatively, once the user begins typing in one or more characters (such as the first letters of a contact name or the first digits of a telephone number) the application may then generate and send the API query. In this latter scenario, the application may include in the query a specification of the characters/digits entered so far, and the operating system may use that data as key to search the contact data 32 so as to limit the returned set of destination-addresses to those that match the characters/digits entered so far.

The API query provided by the application may expressly specify one or more classifications of the new communication, so that the operating system can return destination-address suggestions rank-ordered in manner specific to the classification(s) at issue. The query may use the count-classification data 36 for this purpose. For instance, the query may expressly specify the communication type and/or application class with one or more levels of granularity, such as calling, circuit-voice calling, VoIP calling, messaging, SMS/MMS messaging, or e-mail messaging, for instance. Alternatively, some or all of this information may be implicit in the query being received from a particular application. For instance, if the query is received from a basic telephone calling application, it may be implicit (e.g., from application registration data in the operating system) that the communication type is a voice call and the application class is "calling." Other examples are possible as well.

In any event, the operating system may thereby determine the communication type and/or application class at issue, so as to facilitate providing an applicable rank-ordering. Further, the operating system may also determine one or more other characteristics of the new communication, such as source persona, time and/or location, so as to facilitate tailoring the rank-ordering based on the one or more other characteristics in the manner discussed above for instance. In practice, for instance, the querying application may include a source-persona identifier its API query, or the operating system may refer to a more general source-persona (e.g., user profile) setting of the device or application to determine the source-persona. Likewise, the operating system may be informed of or may determine the current time and/or current location.

At block 106, the functions may then include, in response to the first request, sending a list comprising the plurality of communication addresses. Further, in response to the new communication being of the first communication type, the plurality of communication addresses in the list may be ordered according to a rank-ordering that is based at least in part on the first plurality of counts, and perhaps based on one or more other factors such as those discussed above.

In line with the discussion above, this function may involve providing a list of destination-addresses including the plurality of communication addresses rank-ordered in a manner specific to the type of the new communication. The operating system may provide this list to the first application as a response to the API query received from the first application, for instance as an array of destination-address suggestions.

The provided list of destination-address suggestions can include the plurality of communication addresses in order of their frequency of use (e.g., use count) specifically for the communication type at issue, such as from most frequency (e.g., highest count) to least frequent (e.g., lowest count). For instance, with the addresses in FIG. 3, say the communication type at issue is "calling." Based on the count data indicated in the table, the list may then order the addresses as {B3, A2, B1, B2, A1, A3}, since the "calling"-specific counts for those addresses are, respectively, {15, 13, 9, 7, 1, 0}. On the other hand, if the communication type is "messaging," the list may order the addresses as {B2, A1, B1, A2, A3, B3}, since the "messaging"-specific counts for those addresses are, respectively {33, 25, 11, 5, 3, 0}.

Alternatively, the rank-ordering could be contact-specific, rank-ordering contacts based on frequency of communication of the particular type to the contacts, and then rank-ordering the addresses within each contact. (In that case, the present method may apply on a per contact basis, and perhaps also among a group of contacts.) For instance, if the communication type is "calling," the operating system could determine that contact A is the most frequently called and may therefore list contact A's addresses first in rank-order, followed by contact B's addresses in rank order. Thus, the rank-ordered list of communication addresses may be {CONTACT-A: A2, A1, A3} followed by {CONTACT-B: B3, B1, B2}. On the other hand, if the communication type is "messaging," the system could determine that contact B is the most frequent destination for messages, and so the rank-ordered list of communication addresses may include {CONTACT-B: B2, B1, B3} followed by {CONTACT-A: A1, A2, A3}.

In a scenario where the operating system maintains multiple different counts for each address of a plurality of addresses and where the rank-ordering is based on the counts specific to a particular communication type and/or application class for instance, it may be the case that the rank-ordering is not based on counts for one or more other communication types and/or application classes. For instance, for a "calling" communication, the addresses may be rank-ordered based on counts specific to calling, but not on counts specific to messaging (i.e., without regard to counts specific to messaging). And for a "messaging" communication, the addresses may be rank-ordered based on counts specific to messaging, but not on counts specific to calling (i.e., without regard to counts specific to calling).

As further noted above, one or more of the counts that form the basis of the rank-ordering could be based on communication by more than one application. Thus, although the operating system may be sending the rank-ordered destination-address suggestions to a particular application, one or more of the counts that form the basis for that rank-ordering may be based on communications placed by at least one other application. For instance, if the querying application is a VoIP calling application, it may be the case that the some or all of the counts in the "calling" column of FIG. 3 encompassed one or more calling communications placed by a circuit-voice telephone application instead. Other examples are possible as well.

In practice, the operating system may establish the rank-ordered list of addresses dynamically at the time the operating system is to convey the rank-ordered listing to the application. For instance, upon receipt of an API query or otherwise detecting a request for destination-address suggestions, the operating system may establish communication-type-specific counts based on the communication-history data and may then establish the applicable rank-ordering, possibly considering one or more other factors in the process as well. Or if the applicable communication-type-specific count has already been established, the operating system may respond to the API query or other request by then establishing the applicable rank-ordering based on those existing counts. Alternatively, the operating system may establish various rank-ordered lists (per communication type and/or application class) in advance of detecting the request for the destination-address suggestions, such as on an ongoing basis as a background process, so as to have the applicable rank-ordering available for quickly providing to any querying application.

In any case, the act of establishing the list of destination-address suggestions may involve sorting at least the plurality of communication addresses based at least in part on their counts of communications of the applicable communication type. For instance, the act of establishing the list may involve sorting the addresses in order from most communications of the applicable communication type to least communications of the applicable communication type, possibly taking into consideration other factors as well, such as source persona, time, and/or location for instance as discussed above.

Optimally, when the first application program receives the list of destination-address suggestions from the operating system (e.g., from abstraction layer 44), the application program may cause the device to present the destination address suggestions, including the plurality of communication addresses in the established rank-order, on the user interface 16 for viewing by the user. For instance, the application program may send the list for output at a display, such as by generating a GUI that includes presentation of the list and providing the GUI to the operating for presentation on the display. The application may then allow the user to select one of the presented destination-addresses to be used for the communication at issue.

Note that "presenting" or "outputting" the list of destination-address suggestions at a display or otherwise on a user interface may involve scrollably-presenting the list. For instance, only a portion of the list might be presented at a time, such that a user may need to scroll through the list to see the remainder.

With the benefit of the method, in practice, the operating system may further provide another list comprising the plurality of communication addresses rank-ordered differently to facilitate selection of an address for a communication of a different communication type.

For instance, the operating system may detect a second request for a plurality of destination-address suggestions, the second request being received from an application program other than the first application program and being associated with a second new communication of the second communication type. In turn, in response to the second request, the operating system may send a second list comprising the plurality of communication addresses, in which the plurality of communication addresses are ordered according to a second rank-ordering that is based at least in part on the second plurality of counts, and perhaps based on one or more other factors such as those discussed above. The application program that provided the second request may then send for output at the display or otherwise on a user interface the second list comprising the plurality of communication addresses ordered according to the second rank-ordering, to facilitate selection of a destination address for the second new communication.

Figure 5:
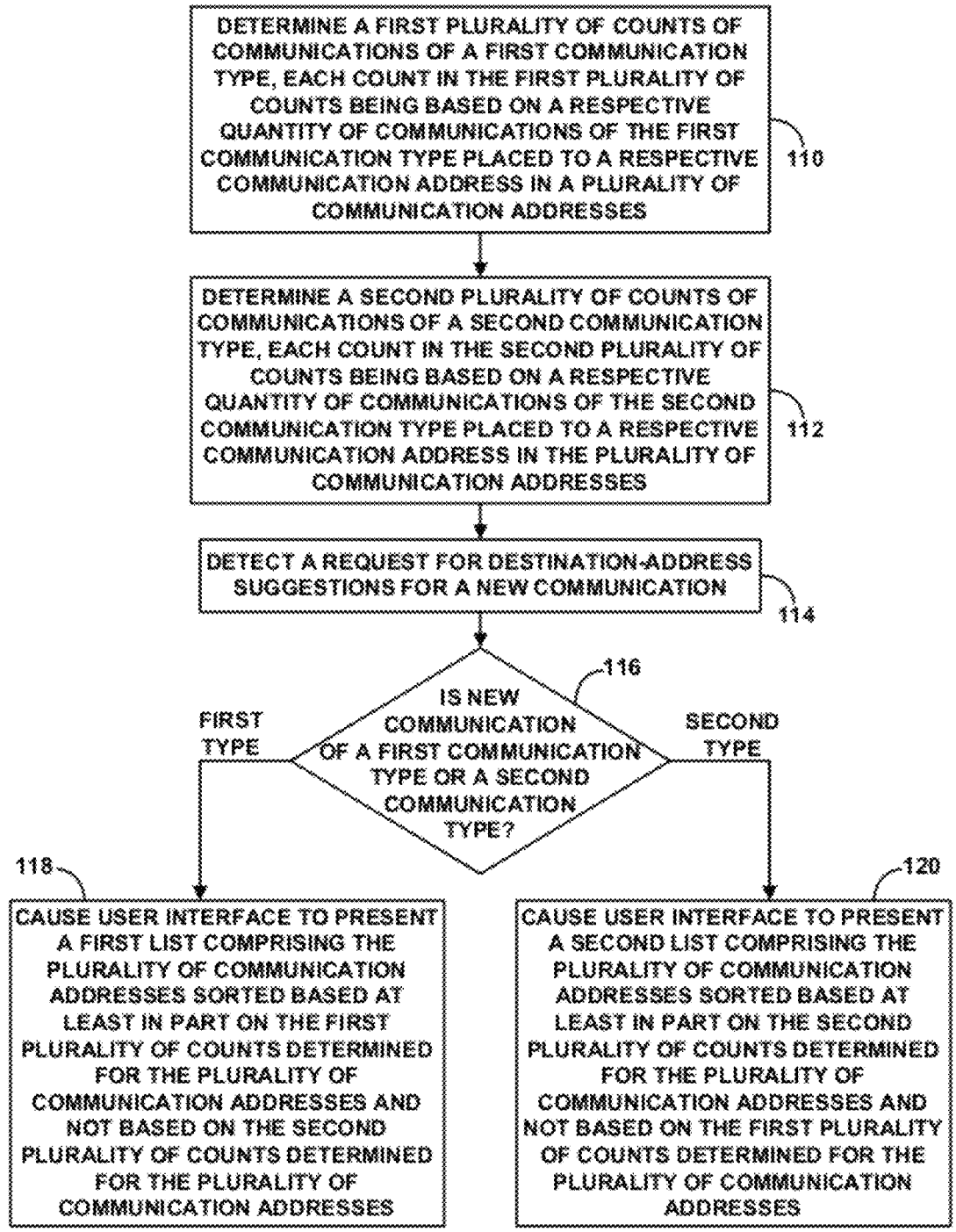
FIG. 5 is another flow chart depicting functions that can be carried out in accordance with the method.

FIG. 5 is a flow chart depicting functions that can be carried out in accordance with the method, to provide a list of destination-address suggestions including a plurality of communication addresses ordered according to one rank-ordering or another depending on the communication type at issue. As shown in FIG. 5, at block 110, the functions may include determining a first plurality of counts of communications of a first communication type, with each count in the first plurality of counts being based on a respective quantity of communications of the first communication type placed to a respective communication address in a plurality of communication addresses. Further, at block 112, the functions may include determining a second plurality of counts of communications of a second communication type, with each count in the second plurality of counts being based on a respective quantity of communications of the second communication type placed to a respective communication address in the plurality of communication addresses. Optimally, the first communication type and the second communication type may be mutually exclusive, such as calling and messaging for instance (where one type is not encompassed by the other, and vice versa).

At block 114, the functions may then further include detecting a request for destination-address suggestions for a new communication. And at block 116, the functions may include determining if the new communication is of a first communication type or a second communication type. If the determination is that the new communication is of the first communication type, then, at block 118, the functions may include presenting on a user interface, or causing a user interface to present, a first list comprising the plurality of communication addresses sorted based at least in part on the first plurality of counts determined for the plurality of communication addresses and not based on the second plurality of counts determined for the plurality of communication addresses. On the other hand, if the determination is that the new communication type is of the second communication type, then, at block 120, the functions may instead include presenting on the user interface, a second list comprising the plurality of communication addresses sorted based at least in part on the second plurality of counts determined for the plurality of communication addresses and not based on the first plurality of counts determined for the plurality of communication addresses.

Figure 6:
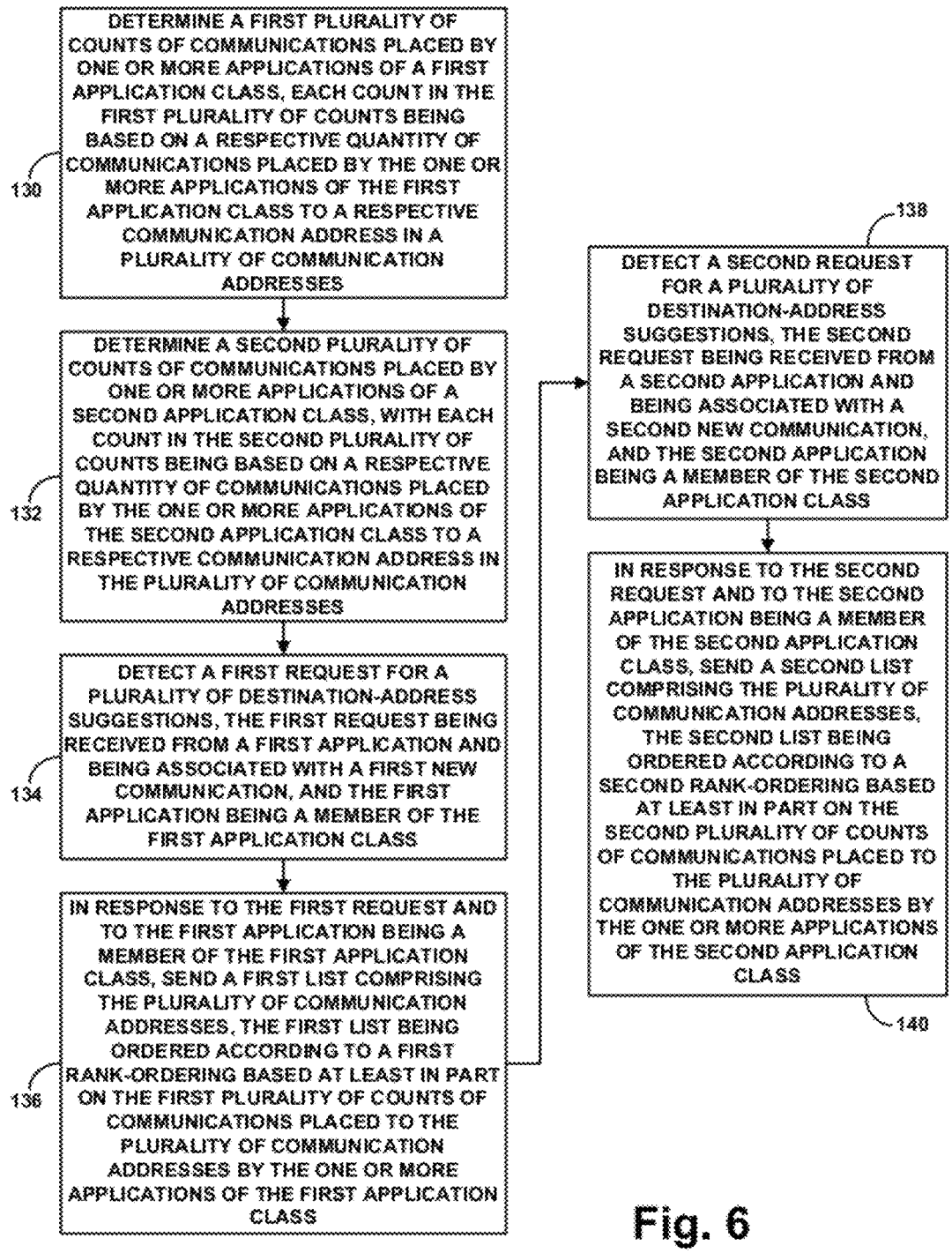
FIG. 6 is another flow chart depicting functions that can be carried out in accordance with the method

FIG. 6 is next another flow chart depicting functions that can be carried out in accordance with the method. As shown in FIG. 5, at block 130, the functions may include determining a first plurality of counts of communications placed by one or more applications of a first application class, with each count in the first plurality of counts being based on a respective quantity of communications placed by the one or more applications of the first application class to a respective communication address in a plurality of communication addresses. Further, at block 132, the functions may include determining a second plurality of counts of communications placed by one or more applications of a second application class, with each count in the second plurality of counts being based on a respective quantity of communications placed by the one or more applications of the second application class to a respective communication address in the plurality of communication addresses. These functions can be carried out largely in the same manner discussed above with respect to communication type, but with classification being based on application class as may be specified in or implicit from usage reports for instance. Further, the first and second application classes may be mutually exclusive (where one class is not encompassed by the other, and vice versa).

At block 134, the functions may then include detecting a first request for a plurality of destination-address suggestions, with the first request being received from a first application and being associated with a first new communication, and with the first application being a member of the first application class. At block 136, in response to the first request, the functions may include sending a first list comprising the plurality of communication addresses. Further, in response to the first application (that is generating the first new communication) being a member of the first application class, the plurality of communication addresses in the first list may be ordered according to a first rank-ordering that is based at least in part on the first plurality of counts, i.e., based on the counts of communications placed by the one or more applications of the first application class.

In practice, this first rank-ordering may be established by sorting the plurality of communication addresses based at least in part on the first plurality of counts of communications placed to the plurality of communication addresses by the one or more applications of the first application class and without regard to the second plurality of counts of communications placed to the plurality of communication addresses by the one or more applications of the second application class, so as to establish the first list comprising the plurality of communication addresses ordered according to the first rank-ordering.

Further, the functions may include, upon detecting the first request, determining that the first application is a member of the first applications class. And the functions may then include, responsive to the determining, sorting at least the plurality of communication addresses based at least in part on the first plurality of counts of communications placed to the plurality of communication addresses by the one or more applications of the first application class, so as to establish the first list comprising the plurality of communication addresses ordered according to the first rank-ordering. Alternatively, the functions may involve, in advance of the detecting the first request, sorting at least the plurality of communication addresses based at least on the first plurality of counts of communications placed to the plurality of communication addresses by the one or more applications of the first application class, so as to establish the first list comprising the plurality of communication addresses ordered according to the first rank-ordering.

At block 138, the functions may further include detecting a second request for a plurality of destination-address suggestions, with the second request being received from a second application and being associated with a second new communication, and with the second application being a member of the second application class.

And at block 140, in response to the second request, the functions may include sending a second list comprising the plurality of the communication addresses. Further, in response to the second application (that is generating the second new communication) being a member of the second application class, the plurality of communication addresses in the second list may be ordered according to a second rank-ordering that is based at least in part on the second plurality of counts, i.e., based on the counts of communications placed by the one or more applications of the second application class.

Figure 7:
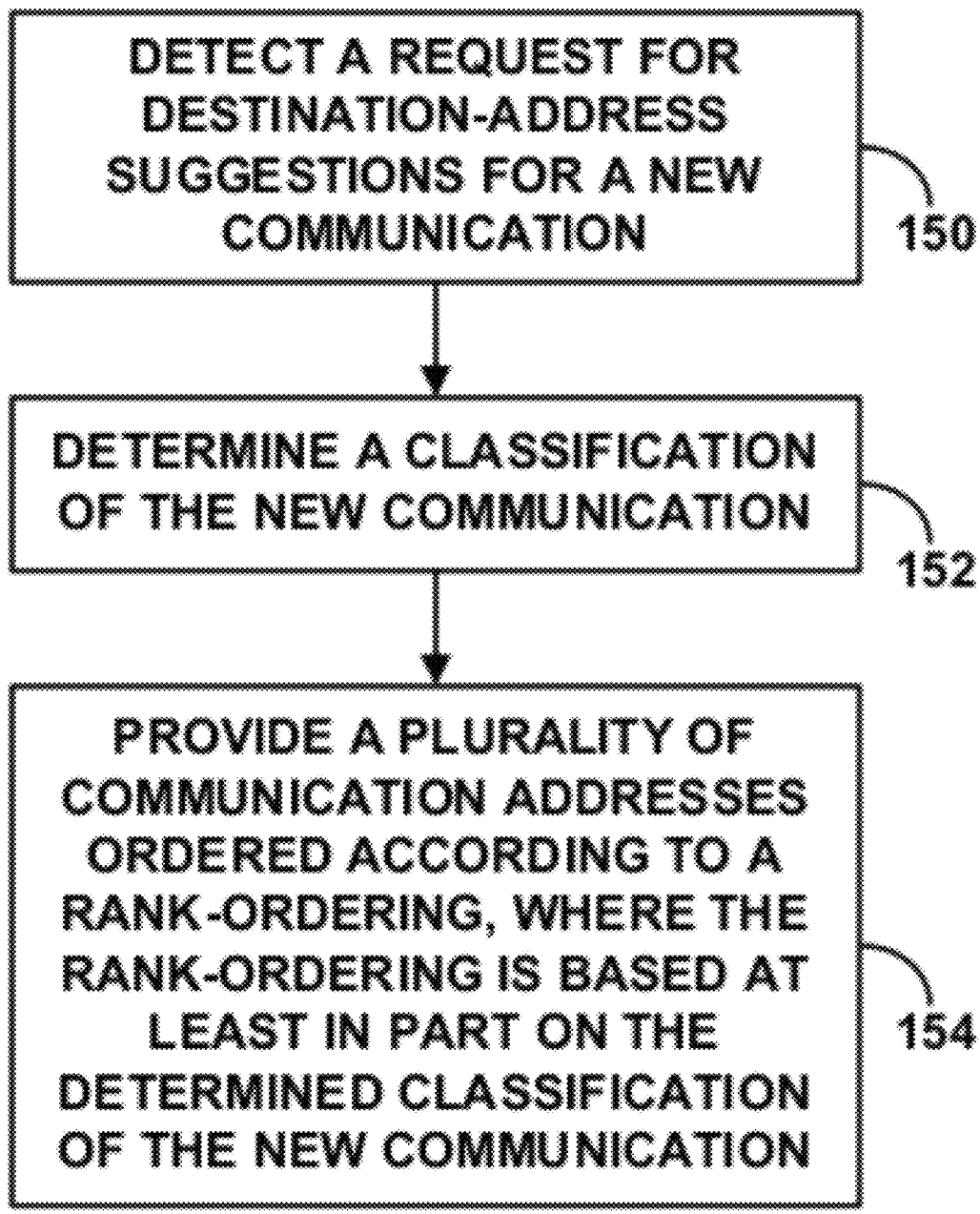
FIG. 7 is yet another flow chart depicting functions that can be carried out in accordance with the method.

FIG. 7 is next another flow chart depicting functions that can be carried out in accordance with the present method. The flow chart of FIG. 7 illustrates that the method may involve providing a particular rank-ordering of destination-address suggestions, where the rank-ordering is based on the classification of the new communication being established (e.g., based on the communication type of the new communication and/or application class of the application establishing the new communication).

As shown in FIG. 7, at block 150, the functions include detecting a request for destination-address suggestions for a new communication. At block 152, the functions then include determining a classification of the new communication (such as a communication type and/or application class for instance). And at block 154, the functions then include providing (e.g., sending), in response to the request, a plurality of communication addresses ordered according to a rank-ordering, where the rank-ordering is based at least in part on the determined classification of the new communication. In practice, for instance, the functions may involve rank-ordering the communication addresses based at least in part on use-counts specific to the determined classification and then providing the rank-ordered listing. Alternatively, the functions may involve maintaining a plurality of classification-specific rank-ordered listings (such as one rank-ordered listing per classification) and selecting from the plurality of classification-specific rank-ordered listings the rank-ordered listing corresponding with the determined classification, and then providing the rank-ordered listing.

Figure 8:
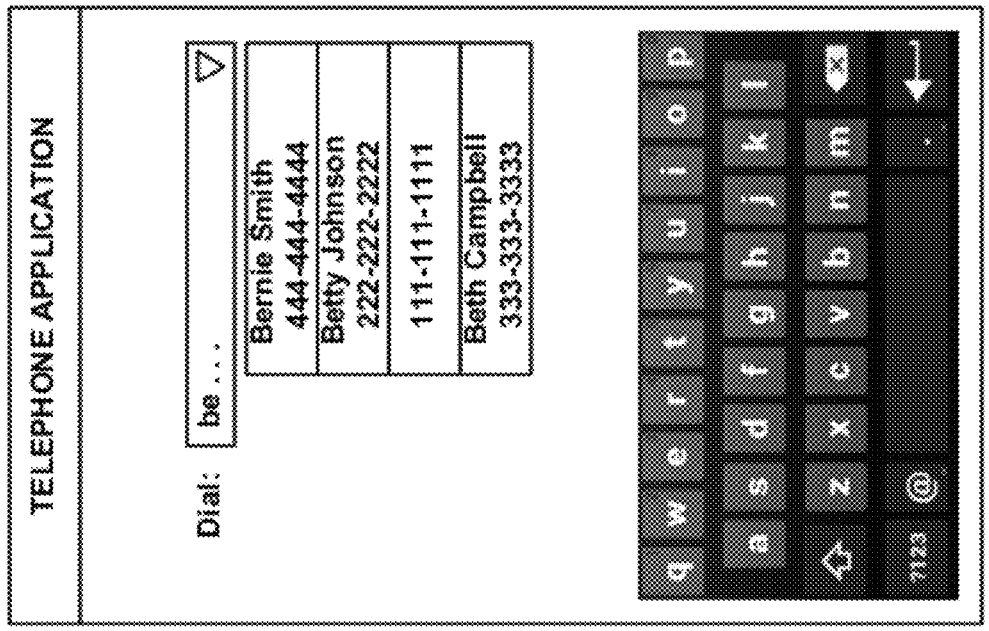
FIG. 8 (parts A and B) is an illustration of graphical user interfaces that could be presented in accordance with the method.
Figure 8:
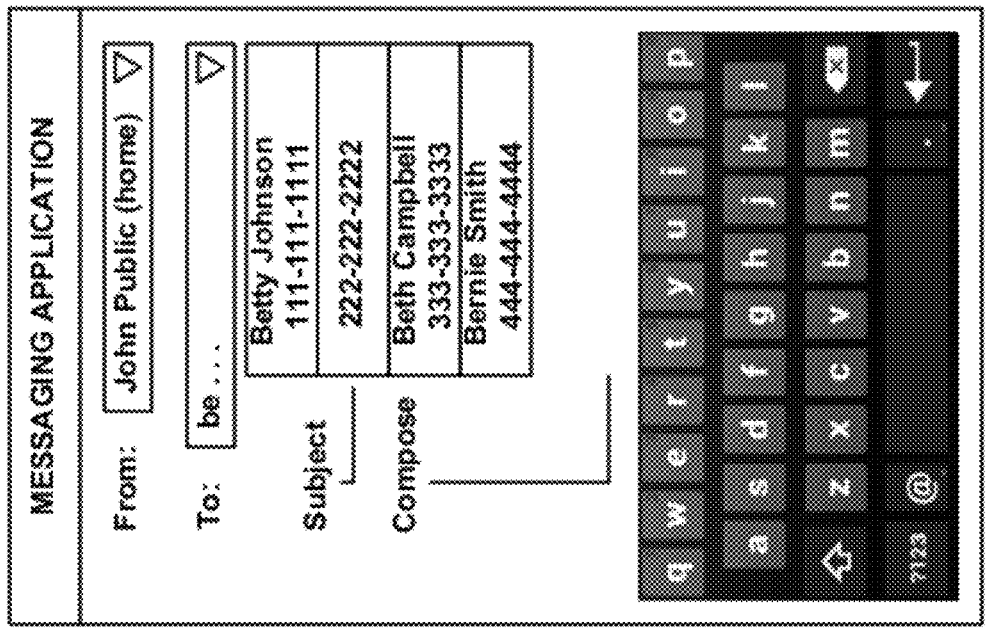

Finally, FIG. 8 (parts A and B) provides two example GUI images to illustrate how the present method can provide different rank-ordering of a set of addresses based on the type of communication being generated. FIG. 8A depicts a GUI of a messaging application (such as an SMS or MMS application for instance), and FIG. 8B depicts a GUI of a telephone application (such as a circuit-voice calling application for instance). In both images, the GUI includes a QWERTY keyboard that a user can engage in order to type the first characters of a destination contact for a desired communication. Further, the messaging GUI of FIG. 6A shows fields for "From", "Subject", and "Compose" (with the Subject and Compose fields being partially covered by other information), which a user may complete for a text message.

Both of these example GUI images include a field that the user can complete to indicate a desired destination address for a new communication. The messaging GUI includes a "To" field, and the telephone GUI includes a "Dial" field. Further, each image shows that a user has so far typed the characters "be" as a destination contact name. And both images show the GUI presenting a list of destination-address suggestions, as stacked blocks under the destination field. In accordance with the present method, however, the list of destination-addresses shown on the messaging GUI is rank-ordered differently than the list of the same destination-addresses shown in the telephone GUI, due at least in part to the addresses having different relative use-counts for messaging than for telephone calling.

The messaging application GUI, for instance, lists matching contact names "Betty Johnson", "Beth Campbell", and "Bernie Smith". For Betty Johnson, the list then specifies in rank-order telephone numbers 111-111-1111 and 222-222-2222. The list then specifies one telephone number 333-333-3333 for Beth Campbell, and one telephone number 444-444-4444 for Bernie Smith. In accordance with the present method, this rank-ordering may be due to the use-count data indicating that Betty is the most often the destination of text messages, followed by Bernie and then by Betty, and that, for Betty, her number 111-111-1111 is more often the destination of text messages than her number 222-222-2222.

On the other hand, the telephone application GUI lists the contacts in the order Bernie, Betty, and Beth, specifying the addresses for each and reversing the order of Betty's numbers. In accordance with the present method, this rank-ordering may be due to the use-count data indicating that Bernie is most often called, followed by Betty and then Beth, and that, for Betty, her number 222-222-2222 is called more often than her number 111-111-1111.

Provided with either of these GUIs, a user may then select a desired one of the blocks provided in the list of destination-address suggestions, and device may responsively enter the selected destination-address into the destination field for the communication being established. The user may then direct the device to establish the communication to that address.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims. For instance, although the foregoing description uses two communication types and/or application classes as example classifications of communications for purposes of rank-ordering a list of destination-address suggestions, other examples are possible as well, and more than two classifications could be applied, each leading to a respective different rank-ordering of communication addresses.

We claim:

1. A non-transitory computer-readable medium having stored thereon program instructions executable by a processor to carry out functions comprising:
   determining a first plurality of counts of communications of a first communication type, wherein each count in the first plurality of counts is based on a respective quantity of communications of the first communication type placed to a respective communication address in a plurality of communication addresses;
   determining a second plurality of counts of communications of a second communication type, wherein each count in the second plurality of counts is based on a respective quantity of communications of the second communication type placed to a respective communication address in the plurality of communication addresses;
   detecting a request for a plurality of destination address suggestions, the request being received from a first application program and being associated with a new communication, the new communication being of the first communication type and having an associated source persona;
   sorting at least the plurality of communication addresses based at least in part on (i) the first plurality of counts and (ii) the source persona, so as to establish a list comprising the plurality of communication addresses ordered according to a rank-ordering that is based at least in part on the first plurality of counts and is further based at least in part on the source persona, wherein at least one count from the first plurality of counts is based at least in part on one or more communications placed by at least a second application program different from the first application program;
   sending, in response to the request and to the new communication being of the first communication type and having the associated source persona, the list comprising the plurality of communication addresses ordered according to the rank-ordering that is based at least in part on the first plurality of counts and is further based at least in part on the source persona; and
   outputting the list for display.

2. The non-transitory computer-readable medium of claim 1, wherein the functions further comprise:
   upon detecting the request, determining that the new communication is of the first communication type and is associated with the source persona; and
   carrying out the sorting in response to the determining.

3. The non-transitory computer-readable medium of claim 1, wherein the rank-ordering is further based at least in part on recency of the communications of the first communication type, and wherein the sorting is further based at least in part on the recency of the communications of the first communication type.

4. The non-transitory computer-readable medium of claim 3, wherein sorting at least the plurality of communication addresses comprises categorizing the communications of the first communication type into buckets based on recency.

5. The non-transitory computer-readable medium of claim 1, wherein the functions further comprise:
   carrying out the sorting in advance of the detecting the request.

6. The non-transitory computer-readable medium of claim 1, wherein the request is a first request, the new communication is a first new communication, the list is a first list, and the rank-ordering is a first rank-ordering, and wherein the functions further comprise:
   detecting a second request for a plurality of destination-address suggestions, the second request being received from a third application program and being associated with a second new communication, the second new communication being of the second communication type;
   sending, in response to the second request, a second list comprising the plurality of communication addresses, wherein, in response to the second new communication being of the second communication type, the plurality of communication addresses in the list are ordered according to a second rank-ordering that is based at least in part on the second plurality of counts and is different from the first rank-ordering; and
   outputting the second list for display.

7. The non-transitory computer-readable medium of claim 1, wherein the plurality of communication addresses are telephone numbers, the first communication type is telephone call communication, and the second communication type comprises messages selected from the group consisting of short messaging service (SMS) messages and multimedia messaging service (MMS) messages.

8. The non-transitory computer-readable medium of claim 1, wherein the plurality of communication addresses are e-mail addresses, the first communication type is e-mail communication, and the second communication type comprises messages selected from the group consisting of short messaging service (SMS) messages and multimedia messaging service (MMS) messages.

9. The non-transitory computer-readable medium of claim 1, wherein the program instructions are part of a computer operating system, and wherein the functions further comprise:
   receiving usage records from a plurality of application programs, and establishing the first plurality of counts and the second plurality of counts based on the received usage records.

10. The non-transitory computer-readable medium of claim 9, wherein the functions further comprise:
   providing an abstraction layer through which to receive the usage records and through which to detect the request.

11. A non-transitory machine readable medium having stored thereon instructions executable by a processor to carry out functions comprising:
   determining a first plurality of counts of communications of a first communication type, wherein each count in the first plurality of counts is based on a respective quantity of communications of the first communication type placed to a respective communication address in a plurality of communication addresses;
   determining a second plurality of counts of communications of a second communication type, wherein each count in the second plurality of counts is based on a respective quantity of communications of the second communication type placed to a respective communication address in the plurality of communication addresses, the first communication type and the second communication type being mutually exclusive;
   detecting a request for destination-address suggestions for a new communication, the new communication being associated with a source persona; and
   in response to the request, (i) if the new communication is of the first communication type, then causing a user interface to present a first list comprising the plurality of communication addresses sorted based at least in part on the source persona and the first plurality of counts determined for the plurality of communication addresses and not based on the second plurality of counts determined for the plurality of communication addresses, and (ii) if the new communication is of the second communication type, then causing the user interface to present a second list comprising the plurality of communication addresses sorted based at least in part on the source persona and the second plurality of counts determined for the plurality of communication addresses and not based on the first plurality of counts determined for the plurality of communication addresses.

12. The non-transitory computer-readable medium of claim 11, wherein the plurality of communication addresses are telephone numbers, the communications of the first communication type are telephone calls, and the communications of the second communication type comprise messages selected from the group consisting of short messaging service (SMS) messages and multimedia messaging service (MMS) messages.

13. The non-transitory computer-readable medium of claim 11, wherein the plurality of communication addresses are e-mail addresses, the communications of the first communication type are e-mail messages, and the communications of the second communication type comprise messages selected from the group consisting of short messaging service (SMS) messages and multimedia messaging service (MMS) messages.

14. The non-transitory computer-readable medium of claim 11, wherein the functions further comprise:
   responsive to the request, making a determination of whether the new communication is of the first communication type or of the second communication type, so as to then decide whether to cause the user interface to present the first list or to cause the user interface to present the second list.

15. The non-transitory computer-readable medium of claim 14, wherein the functions further comprise:
   after determining whether the communication is of the first communication type or of the second communication type, sorting at least the plurality of communication addresses accordingly for presentation on the user interface.

16. The non-transitory computer-readable medium of claim 14, wherein the functions further comprise:
   in advance of the detecting the request, (a) sorting at least the plurality of communication addresses based at least in part on the source persona and the first plurality of counts, so as to establish the first list, and (b) sorting at least the plurality of communication addresses based at least in part on the source persona and the second plurality of counts, to establish the second list.

17. The non-transitory computer-readable medium of claim 11, wherein:
   causing the user interface to present the first list comprising the plurality communication addresses sorted based at least in part on the source persona and the first plurality of counts and not based on the second plurality of counts comprises causing the user interface to present the first list comprising the plurality of communication addresses sorted based on the source persona and the first plurality of counts and further based at least in part on communication recency; and
   causing the user interface to present the second list comprising the plurality of communication addresses sorted based at least in part on the source persona and the second plurality of counts and not based on the first plurality of counts comprises causing the user interface to present the second list comprising the plurality of communication addresses sorted based on the source persona and the second plurality of counts and further based at least in part on communication recency.

18. The non-transitory computer-readable medium of claim 11,
   wherein, for at least a first of the communication addresses in the plurality of communication addresses, the first plurality of counts includes a count based at least in part communications placed to that first communication address by a plurality of communication applications.

19. A method comprising:
   a communication device determining a first plurality of counts of communications of a first communication type, wherein each count in the first plurality of counts is based on a respective quantity of communications of the first communication type placed to a respective communication address in a plurality of communication addresses;

the communication device determining a second plurality of counts of communications of a second communication type, wherein each count in the second plurality of counts is based on a respective quantity of communications of the second communication type placed to a respective communication address in the plurality of communication addresses, the first communication type and the second communication type being mutually exclusive;

the communication device detecting a request for destination-address suggestions for a new communication, the new communication being associated with a source persona; and responsive to the request, (i) if the new communication is of the first communication type, then the communication device presenting on a user interface a first list comprising the plurality of communication addresses sorted based at least in part on the source persona and the first plurality of counts determined for the plurality of communication addresses and not based on the second plurality of counts determined for the plurality of communication addresses, and (ii) if the new communication is of the second communication type, then the communication device presenting on the user interface a second list comprising the plurality of communication addresses sorted based at least in part on the source persona and the second plurality of counts determined for the plurality of communication addresses and not based on the first plurality of counts determined for the plurality of communication addresses.

20. A method comprising:

a computer processor determining a first plurality of counts of communications placed by one or more applications of a first application class, wherein each count in the first plurality of counts is based on a respective quantity of communications placed by the one or more applications of the first application class to a respective communication address in a plurality of communication addresses;

the computer processor determining a second plurality of counts of communications placed by one or more applications of a second application class, wherein each count in the second plurality of counts is based on a respective quantity of communications placed by the one or more applications of the second application class to a respective communication address in the plurality of communication addresses;

the computer processor detecting a request for a plurality of destination-address suggestions, the request being received from a first application and being associated with a new communication, the first application being a member of the first application class, and the new communication being associated with a source persona; and in response to the request, the computer processor causing a user interface to present a list comprising the plurality of the communication addresses, wherein, in response to the first application being a member of the first application class, the plurality of communication addresses in the list are ordered according to a rank-ordering that is based at least in part on the first plurality of counts of communications placed by the one or more applications of the first application class, and in response to the new communication being associated with the source persona, the rank-ordering is further based at least in part on the source persona.

21. The method of claim 20, wherein the request is a first request, the new communication is a first new communication, the list is a first list, and the rank-ordering is a first rank-ordering, and wherein the functions further comprise:

the computer processor detecting a second request for a plurality of destination-address suggestions, the second request being received from a second application and being associated with a second new communication, the second application being a member of the second application class; and in response to the second request, the computer processor causing a user interface to present a second list comprising the plurality of the communication addresses, wherein, in response to the second application being a member of the second application class, the plurality of communication addresses in the second list are ordered according to a second rank-ordering that is based at least in part on the second plurality of counts of communications placed by the one or more applications of the second application class, the second rank-ordering being different than the first rank-ordering.

22. The method of claim 21, wherein the first application class and the second application class are mutually exclusive.

23. The method of claim 20, further comprising:

the computer processor sorting at least the plurality of communication addresses based at least in part on the first plurality of counts of communications placed to the plurality of communication addresses by the one or more applications of the first application class and without regard to the second plurality of counts of communications placed to the plurality of communication addresses by the one or more applications of the second application class, so as to establish the list comprising the plurality of communication addresses ordered according to the rank-ordering.

24. The method of claim 20, further comprising:

upon detecting the request, the computer processor determining that the first application is a member of the first application class; and responsive to the determining, the computer processor sorting at least the plurality of communication addresses based at least on the first plurality of counts of communications placed to the plurality of communication addresses by the one or more applications of the first application class, so as to establish the list comprising the plurality of communication addresses ordered according to the rank-ordering.

25. The method of claim 20, further comprising:

in advance of the detecting the request, the computer processor sorting at least the plurality of communication addresses based at least on the first plurality of counts of communications placed to the plurality of communication addresses by the one or more applications of the first application class, so as to establish the list comprising the plurality of communication addresses ordered according to the rank-ordering.

26. The method of claim 20, further comprising the computer processor sorting at least the plurality of communication addresses based at least on the first plurality of counts of communications placed to the plurality of communication addresses by the one or more applications of the first application class, so as to establish the list comprising the plurality of communication addresses ordered according to the rank-ordering.

27. The method of claim 20, wherein the rank-ordering is further based on communication recency.

* * * * *